(12) United States Patent
Matsuoka et al.

(10) Patent No.: US 11,567,044 B2
(45) Date of Patent: Jan. 31, 2023

(54) ANALYSIS DEVICE HAVING A LIQUID CHROMATOGRAPH AND METHOD FOR ANALYZING A LIQUID CHROMATOGRAPH

(71) Applicant: HITACHI HIGH-TECH CORPORATION, Tokyo (JP)

(72) Inventors: Shinya Matsuoka, Tokyo (JP); Takayuki Sugime, Tokyo (JP); Daisuke Ebihara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 33 days.

(21) Appl. No.: 17/277,749

(22) PCT Filed: Jul. 24, 2019

(86) PCT No.: PCT/JP2019/029082
§ 371 (c)(1),
(2) Date: Mar. 19, 2021

(87) PCT Pub. No.: WO2020/059290
PCT Pub. Date: Mar. 26, 2020

(65) Prior Publication Data
US 2021/0356443 A1 Nov. 18, 2021

(30) Foreign Application Priority Data
Sep. 21, 2018 (JP) .............................. JP2018-178002

(51) Int. Cl.
*G01N 30/46* (2006.01)
*G01N 30/72* (2006.01)
(Continued)

(52) U.S. Cl.
CPC ......... *G01N 30/7233* (2013.01); *G01N 30/32* (2013.01); *G01N 30/46* (2013.01); *G01N 2030/027* (2013.01)

(58) Field of Classification Search
CPC .... G01N 30/7233; G01N 30/32; G01N 30/46; G01N 2030/027; G01N 2030/889; G01N 30/88
See application file for complete search history.

(56) References Cited

U.S. PATENT DOCUMENTS 5,417,853 A * 5/1995 Mizuno ................ G01N 33/723
210/143
5,892,458 A * 4/1999 Anderer ................ G16H 10/40
210/659
(Continued)

FOREIGN PATENT DOCUMENTS

JP 64-54350 A 3/1989
JP 6-324027 A 11/1994
(Continued)

OTHER PUBLICATIONS

"LABOSPECT006, Automatic Analysis Device and Attachment Thereof", Jun. 2017, (http://www.info.pmda.go.jp/downfiles/md/PDF/530555/530555_08B2X10005000038_A_01_04.pdf).
(Continued)

*Primary Examiner* — David J Bolduc
(74) *Attorney, Agent, or Firm* — Mattingly & Malur, PC

(57) ABSTRACT

An analysis device having a liquid chromatograph prevents a plurality of streams from being unusable at the same time Whether a usable stream is 0 or not among streams 1, 2, and 3 is determined. In a case where none of the streams is usable, the control unit skips a sample introduction in the cycle; and where there is one usable stream in the cycle, the stream is used. In a case where there are multiple streams that are usable in the cycle, and there are multiple streams of which the remaining number of uses of a separation column is the minimum, the stream having the smallest stream number is used; and where there is one stream of which the remaining number of uses of a separation column
(Continued)

is the minimum, the stream to which the separation column having the minimum remaining number of uses is connected and used.

8 Claims, 4 Drawing Sheets

(51) Int. Cl.
*G01N 30/32* (2006.01)
*G01N 30/02* (2006.01)

(56) References Cited

U.S. PATENT DOCUMENTS

| | | | | |
|---|---|---|---|---|
| 10,866,217 | B2* | 12/2020 | Yasunaga | G01N 30/468 |
| 10,890,566 | B2* | 1/2021 | Katsuyama | G01N 30/8658 |
| 2007/0288217 | A1* | 12/2007 | Dadala | G01N 30/8651 703/12 |
| 2008/0244437 | A1 | 10/2008 | Fischer | |
| 2015/0040992 | A1* | 2/2015 | Shreve | G01N 30/36 137/565.17 |
| 2015/0253295 | A1 | 9/2015 | Ohashi | |
| 2016/0136543 | A1 | 5/2016 | Shibuya et al. | |
| 2017/0016864 | A1* | 1/2017 | Gjoka | G01N 30/461 |
| 2018/0128797 | A1 | 5/2018 | Satpute et al. | |
| 2018/0143212 | A1* | 5/2018 | Giese | A61K 36/185 |
| 2019/0324000 | A1* | 10/2019 | Randolph | C07K 1/18 |

FOREIGN PATENT DOCUMENTS

| | | |
|---|---|---|
| JP | 2004-85357 A | 3/2004 |
| JP | 2004-163339 A | 6/2004 |
| JP | 2015-014539 A | 1/2015 |
| JP | 2015-52533 A | 3/2015 |
| JP | 2015-166724 A | 9/2015 |
| JP | 2017-161335 A | 9/2017 |

OTHER PUBLICATIONS

International Search Report of PCT/JP2019/029082 dated Oct. 21, 2019.

International Preliminary Report on Patentability received in corresponding International Application No. PCT/JP2019/029082 dated Mar. 25, 2021.

Extended European Search Report received in corresponding European Application No. 19862833.1 dated May 17, 2022.

* cited by examiner

[FIG. 1]
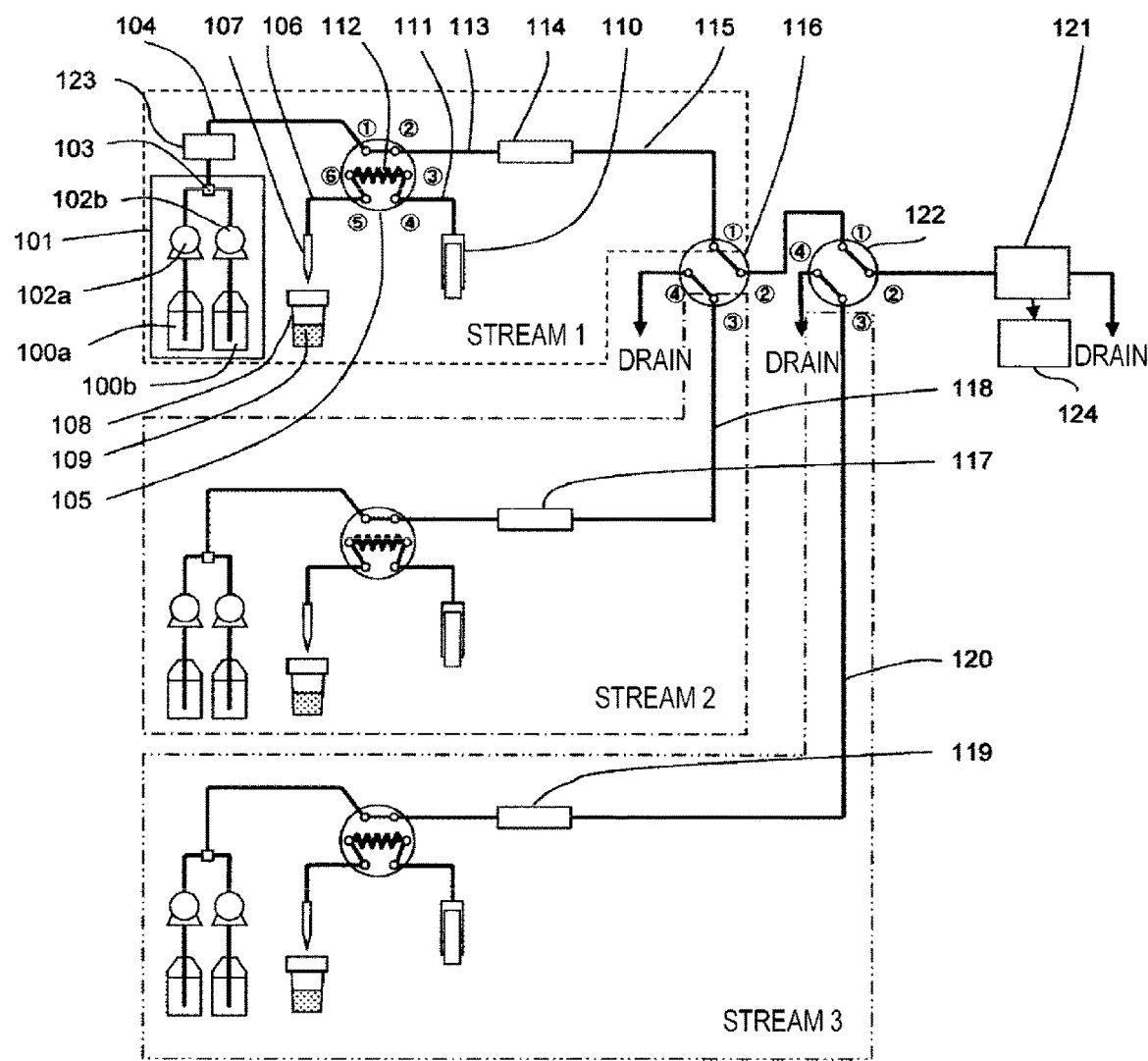

[FIG. 2]
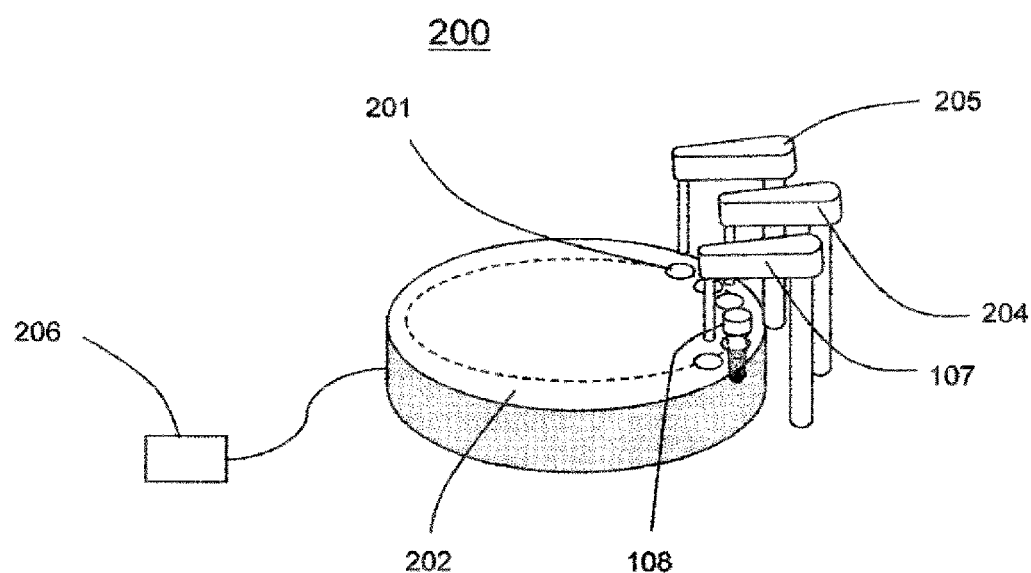

[FIG. 3]
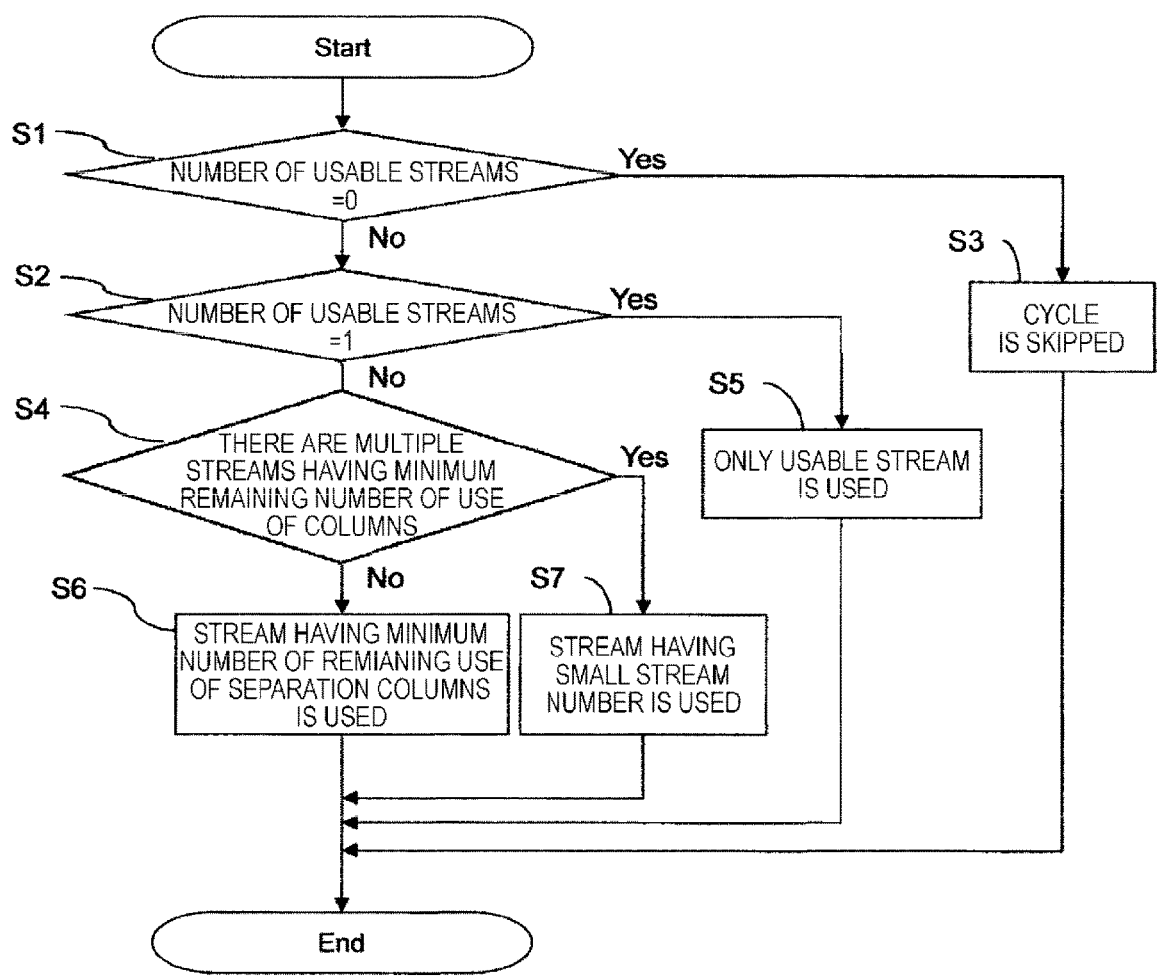

[FIG. 4A]

|  |  | CYCLE | | | |
|---|---|---|---|---|---|
|  |  | -1 | 0 | +1 | +2 |
| STREAM 1 | STATE | ○ | ○ | △ | ○ |
|  | REMAINING NUMBER OF USE | 50 | 50 | 49 | 49 |
| STREAM 2 | STATE | ○ | ○ | ○ | ○ |
|  | REMAINING NUMBER OF USE | 40 | 40 | 40 | 40 |
| STREAM 3 | STATE | ○ | ○ | ○ | ○ |
|  | REMAINING NUMBER OF USE | 30 | 30 | 30 | 30 |

SINCE THERE IS NO USABLE STREAM, CYCLE IS SKIPPED AND NEXT CYCLE IS USED

[FIG. 4B]

|  |  | CYCLE | | | |
|---|---|---|---|---|---|
|  |  | -1 | 0 | +1 | +2 |
| STREAM 1 | STATE | ○ | △ | ○ | ○ |
|  | REMAINING NUMBER OF USE | 50 | 49 | 49 | 49 |
| STREAM 2 | STATE | ○ | ○ | ○ | ○ |
|  | REMAINING NUMBER OF USE | 50 | 50 | 50 | 50 |
| STREAM 3 | STATE | ○ | ○ | ○ | ○ |
|  | REMAINING NUMBER OF USE | 30 | 30 | 30 | 30 |

SINCE THERE IS ONLY ONE USABLE STREAM, "STREAM 1" WHICH IS ONLY USABLE STREAM IS USED

[FIG. 4C]

|  |  | CYCLE | | | |
|---|---|---|---|---|---|
|  |  | -1 | 0 | +1 | +2 |
| STREAM 1 | STATE | ○ | △ | ○ | ○ |
|  | REMAINING NUMBER OF USE | 50 | 49 | 49 | 49 |
| STREAM 2 | STATE | ○ | ▲ | ▲ | ▲ |
|  | REMAINING NUMBER OF USE | 50 | 50 | 50 | 50 |
| STREAM 3 | STATE | ○ | ○ | ○ | ○ |
|  | REMAINING NUMBER OF USE | 30 | 30 | 30 | 30 |

SINCE THERE ARE TWO USABLE STREAMS AND STREAMS HAVE SAME REMAINING NUMBER OF USE, "STREAM 1" HAVING SMALL STREAM NUMBER IS USED

[FIG. 4D]

|  |  | CYCLE | | | |
|---|---|---|---|---|---|
|  |  | -1 | 0 | +1 | +2 |
| STREAM 1 | STATE | ○ | ▲ | ▲ | ▲ |
|  | REMAINING NUMBER OF USE | 50 | 50 | 50 | 50 |
| STREAM 2 | STATE | ○ | △ | ○ | ○ |
|  | REMAINING NUMBER OF USE | 40 | 39 | 39 | 39 |
| STREAM 3 | STATE | ○ | ○ | ○ | ○ |
|  | REMAINING NUMBER OF USE | 30 | 30 | 30 | 30 |

SINCE THERE ARE TWO USABLE STREAMS AND STREAMS HAVE DIFFERENT REMAINING NUMBER OF USE, "STREAM 2" HAVING SMALL REMAINING NUMBER OF USE IS USED. IN THIS CASE, SINCE REMAINING NUMBER OF USE PREFERENTIALLY DECREASES IN STREAM 2, TIME TO USE UP NUMBER OF USE BECOMES SHORTER THAN OTHER STREAMS

○ REPRESENTS CASE WHERE STREAM IS IN USE AND NEXT MEASUREMENT CANNOT BE STARTED

△ REPRESENTS CASE WHERE STREAM IS USABLE AND NEXT MEASUREMENT IS STARTED

▲ REPRESENTS CASE WHERE STREAM IS USABLE AND NEXT MEASUREMENT IS NOT STARTED

ANALYSIS DEVICE HAVING A LIQUID CHROMATOGRAPH AND METHOD FOR ANALYZING A LIQUID CHROMATOGRAPH

TECHNICAL FIELD

The present invention relates to an analysis device having a liquid chromatograph and a liquid chromatograph analysis method.

BACKGROUND ART

A liquid chromatograph mass spectrometry device is a device obtained by combining a mass spectrometer as a detector for a liquid chromatograph. By combining separation for a chemical structure of a substance by the liquid chromatograph and separation for a mass of the substance by the mass spectrometer, each component can be qualitatively and quantitatively determined even in a case of similar substances. With this feature, for example, a target substance can be qualitatively and quantitatively determined even in a system which is metabolized in a body and in which many similar substances are mixed, such as a pharmaceutical in a biological sample, and application to a clinical examination field is expected.

When the liquid chromatograph mass spectrometry device is applied to the clinical examination field, there is a problem that the separation by the liquid chromatograph takes a relatively long time. For example, a biochemical automatic analysis device used in the clinical examination field is commercially available as a device capable of performing measurement of 1 sample at 3.6 seconds, that is, 1000 specimens per hour (Non-PTL 1).

The number of specimens that can be processed per hour is referred to as a throughput, and in the example of the biochemical automatic analysis device described above, the throughput is 1000 specimens/hour. On the other hand, a separation time of the liquid chromatograph is 240 seconds, for example, in a commercially available testosterone (male hormone) measurement kit. A throughput in a case of using this measurement kit is 15 specimens/hour. This is only 1.5% of the throughput of 1000 specimens/hour which is an example of the throughput of the biochemical automatic analysis device, which poses a technical problem in processing a specimen in a clinical laboratory.

Specifically, the technical problem described above is that the number of specimens which can be measured in the clinical laboratory within a certain period of time and is measured by the liquid chromatograph mass spectrometry device is limited, it takes a long time to report a result, and it is necessary to introduce more devices to process more specimens, which leads to a financial burden and an increase in a device installation space.

Therefore, in order to apply the liquid chromatograph mass spectrometry device to the clinical examination field, it is necessary to improve the throughput.

One method for improving the throughput includes a method in which a plurality of liquid chromatographs are provided in a single test apparatus, and eluates eluted from the plurality of liquid chromatographs are sequentially switched and measured by the mass spectrometer. A liquid chromatograph mass spectrometry device including such a configuration is called a multi-stream liquid chromatograph mass spectrometry device.

The mass spectrometry device (mass spectrometer) may measure only at a time period when a measurement target substance is contained in the eluates eluted from the liquid chromatographs. Therefore, for one measurement, a time to use the mass spectrometer is about several tens of seconds. Assuming that a time required for the measurement by the mass spectrometer is 36 seconds per measurement and a time required for separation by the liquid chromatograph is 144 seconds (36×4), if there are four liquid chromatograph devices, the mass spectrometer can sequentially process the eluate from each liquid chromatograph without any spare time, and a throughput of 100 specimens/hour can be obtained.

In the multi-stream liquid chromatograph mass spectrometry device, each liquid chromatograph is called a stream. The stream includes at least a liquid feeding pump and a separation column. A flow path switching valve is required to select one of the eluates from the plurality of streams and introduce the eluate into the mass spectrometer. A sample introducing device to the liquid chromatograph may be provided for each stream, or may be shared by the plurality of streams.

As a multi-stream liquid chromatograph mass spectrometry device, for example, PTL 1 discloses a configuration in which a plurality of separation columns are arranged in parallel, a separation column to be used is selected by switching a flow path from a mobile phase liquid feeding unit by a switching valve, and the separation column is connected to a single detector by a switching valve provided at a rear stage of the separation column.

An object of PTL 1 is to enable highly efficient and accurate search for a separation column and a mobile phase suitable for separation of a target component with such a configuration.

Further, PTL 2 discloses a method of continuously analyzing many samples by providing a plurality of separation columns via a switching valve, and when one separation column reaches an end of life, automatically switching to another separation column.

CITATION LIST

Patent Literature

PTL 1: JP-A-2017-161335
PTL 2: JP-A-6-324027

Non-Patent Literature

Non-PTL 1: published by Hitachi High-Technologies Corporation, attached documents of "LABOSPECT006, AUTOMATIC ANALYSIS DEVICE AND ATTACHMENT THEREOF", June, 2017 revised, Overall Mechanism of Independent Administration Medical Device (http://www.info.pmda.go.jp/downfiles/md/PDF/530555/530555_08B2X10005000038_A_01_04.pdf)

SUMMARY OF INVENTION

Technical Problem

Since a performance of the separation column used in the liquid chromatograph is deteriorated due to the measurement, periodic exchange is required.

In the multi-stream liquid chromatograph mass spectrometry device, when a separation column of any stream is required to be exchanged, the stream becomes unusable. However, the multi-stream liquid chromatograph mass spectrometry device can continue to analyze a specimen as long as another stream is usable.

Further, when the multi-stream liquid chromatograph mass spectrometry device is configured to allow the separation column exchange of a stream whose separation column is required to be exchanged while continuing the measurement in another stream, it is possible to restore a stream subjected to the separation column exchange as a stream to be used for analysis.

In the clinical examination field, it is important to maintain a posture in which the measurement can be performed when a measurement request arrives, and it is an extremely important advantage of the multi-stream liquid chromatograph mass spectrometry device that even when a certain stream becomes unusable, an operation of the device can be continued by using another stream.

However, even when the multi-stream liquid chromatograph mass spectrometry device is used, if the separation columns of the plurality of streams are required to be exchanged at the same or close timing, the analysis of the specimen cannot be continued, resulting in a significant decrease in the throughput and a stop of the device.

Therefore, it is necessary to temporally disperse the separation column exchange timings between the streams in the multi-stream liquid chromatograph mass spectrometry device.

A technique described in PTL 2 is a technique for automatically switching to another usable separation column when one separation column reaches an end of life.

However, in the technique described in PTL 2, in a case of a multi-stream configuration using a plurality of streams, when separation columns of the plurality of streams reach ends of life at the same or close timing, a switchable and usable separation column does not exist, and thus analysis of a specimen cannot be continued.

Further, in the technique described in PTL 2, in the case of the multi-stream configuration, a timing at which the plurality of separation columns reach the ends of life cannot be controlled.

An object of the invention is to implement an analysis device having a liquid chromatograph and a liquid chromatograph analysis method, which are capable of avoiding a condition in which a plurality of separation columns reach the end of life and a plurality of streams become unusable at the same time, and preventing a significant decrease in throughput and the stoppage of the device.

Solution to Problem

In order to achieve the object described above, the invention is configured as follows.

An analysis device having a liquid chromatograph includes a plurality of liquid chromatographs each having a separation column for separating a measurement target substance from a sample, a liquid chromatograph selection unit for selecting one of the plurality of liquid chromatographs, a detector for detecting and analyzing the measurement target substance from an eluate eluted from the liquid chromatograph selected by the liquid chromatograph selection unit, and a control unit for controlling the plurality of liquid chromatographs, the liquid chromatograph selection unit, and the detector. The control unit compares numbers of remaining usable times of the separation columns to each other, which are included in each of the plurality of liquid chromatographs, and controls the liquid chromatograph selection unit to select the liquid chromatograph having the separation column with a small number of usable times.

Further, there is provided a liquid chromatograph analysis method, in which a plurality of liquid chromatographs having a separation column for separating a measurement target substance from a sample is included, one of the plurality of liquid chromatographs is selected, a measurement target substance from an eluate eluted from the selected liquid chromatograph is detected by the detector and analyzed, and numbers of remaining usable times of the separation columns are compared to each other, which are included in each of the plurality of liquid chromatographs, and the liquid chromatograph having the separation column with a small number of usable times is selected.

Advantageous Effect

According to the invention, the analysis device having a liquid chromatograph and a liquid chromatograph analysis method are implemented, whereby it is possible to avoid a condition in which a plurality of separation columns reach the end of life and a plurality of streams become unusable at the same time, and to prevent a significant decrease in throughput and the stoppage of the device.

BRIEF DESCRIPTION OF DRAWINGS

FIG. 1 is a diagram illustrating a minimum configuration of a multi-stream liquid chromatograph mass spectrometry device to which an example of the present invention is applied.

FIG. 2 is a diagram explaining a sample introduction mechanism.

FIG. 3 is a flow chart for determining a stream to be used.

FIG. 4A is a diagram showing a table that explains a method for determining a stream to be used from the use state and the remaining number of use of the stream.

FIG. 4B is a diagram showing a table that explains a method for determining a stream to be used from the use state and the remaining number of use of the stream.

FIG. 4C is a diagram showing a table that explains a method for determining a stream to be used from the use state and the remaining number of use of the stream.

FIG. 4D is a diagram showing a table that explains a method for determining a stream to be used from the use state and the remaining number of use of the stream.

DESCRIPTION OF EMBODIMENTS

Hereinafter, an embodiment of the invention will be described in detail with reference to the accompanying drawings. In the drawings, common parts are denoted by the same reference numerals, and repetitive description thereof will be omitted.

Embodiment

An overall configuration of a multi-stream liquid chromatograph mass spectrometry device to which an embodiment of the invention is applied will be described with reference to FIG. 1. The embodiment is an example of a case where the mass spectrometry device is used as an analysis device.

FIG. 1 is a diagram illustrating a minimum configuration of the multi-stream liquid chromatograph mass spectrometry device to which the embodiment of the invention is applied. The invention may include additional elements such as the number of streams, an additional pump, and an additional valve.

In FIG. 1, the multi-stream liquid chromatograph mass spectrometry device to which the embodiment of the invention is applied is an example including three streams of a stream 1, a stream 2, and a stream 3, as will be described later. Each stream constitutes a liquid chromatograph.

In the multi-stream liquid chromatograph mass spectrometry device, the stream 1 includes a mobile phase liquid feeding unit 101 for feeding a mobile phase liquid (100a and 100b). The mobile phase liquid feeding unit 101 includes two pumps (102a and 102b), feeds two different types of liquids at a specified ratio, and mixes them with a mixer part 103 for feeding. This function is called a gradient and is generally used in the liquid chromatograph. The mobile phase liquid feeding unit is connected to one port (a circle mark 1) of a sample introduction switching valve 105 by a flow path A104. A pressure gauge 123 is disposed in the flow path A104.

A sample suction nozzle 107 is connected to another port (a circle mark 5) of the sample introduction switching valve 105 via a flow path B106. The sample suction nozzle 107 is inserted into a sample container 108 by a driving mechanism (not shown) to suction a sample 109 in the sample container. The sample 109 is suctioned by a sample suction unit 110 such as a syringe pump. The sample suction unit 110 is connected to a port (a circle mark 4) of the sample introduction switching valve 105 via a flow path C111.

A sample loop 112 is connected between a port (circle mark 3) and a port (circle mark 6) of the sample introduction switching valve 105. The sample loop 112 is used to keep an amount of a sample introduced into the liquid chromatograph constant.

The sample suction nozzle 107, the sample introduction switching valve 105, and the sample suction unit 110 constitute a sample introducing unit.

A separation column 114 for separating a measurement target substance from the sample is connected to a port (circle mark 2) of the sample introduction switching valve 105 via a flow path D113. The flow path D113 is connected to an upstream side of the separation column 114, a flow path E115 is connected to a downstream side, and the separation column 114 is connected to a port (circle mark 1) of a detector introduction stream switching valve A116 which is another switching valve via the flow path E115.

Components in a dotted line shown in FIG. 1 are defined as a single stream, which is referred to as the stream 1 (first stream).

The sample introduction switching valve 105 includes six ports, and adjacent ports are connected to each other inside the sample introduction switching valve 105. In a state shown in FIG. 1, the port of the circle mark 1 and the port of the circle mark 2, the port of the circle mark 3 and the port of the circle mark 4, as well as the port of the circle mark 5 and the port of the circle mark 6 are connected to each other, respectively. When the sample introduction switching valve 105 performs switching, the connected ports are switched from the state shown in FIG. 1 to a state in which the port of the circle mark 2 and the port of the circle mark 3, the port of the circle mark 4 and the port of the circle mark 5, as well as the port of the circle mark 6 and the port of the circle mark 1 are connected with each other, respectively.

First, in the state of the sample introduction switching valve 105 shown in FIG. 1, when the sample suction nozzle 107 is introduced into the sample 109 of the sample container 108 and the sample suction unit 110 performs a suction operation, the sample 109 is introduced into the sample loop 112 through the flow path B106. When the sample introduction switching valve 105 is switched from this state, the port of the circle mark 1, the port of the circle mark 6, the sample loop 112, the port of the circle mark 3, and the port of the circle mark 2 are connected. The mobile phase is fed from the mobile phase liquid feeding unit 101 toward the port of the circle mark 1 side.

Therefore, the sample 109 cut (introduced) into the sample loop 112 is introduced into the separation column 114.

The sample container 108 can be moved to a predetermined sample nozzle suction position by a sample introduction mechanism to be described later.

As described above, the multi-stream liquid chromatograph mass spectrometry device includes the plurality of streams. Here, three streams including the stream 2 defined as a configuration indicated by a one-dot chain line and the stream 3 defined as a configuration indicated by a two-dot chain line in FIG. 1 are provided. Therefore, the three stream configurations will be described as an example.

Since the configurations of the stream 2 and the stream 3 are the same as the configuration of the stream 1 described above, the description of each component will be omitted.

A separation column 117 of the stream 2 is connected to a port of a circle mark 3 of the detector introduction stream switching valve A116 via a flow path F118 at a downstream side (detector introduction stream switching valve 116 side). A port of a circle mark 2 of the detector introduction stream switching valve A116 is connected to a port of a circle mark 1 of another detector introduction stream switching valve B122.

A separation column 119 of the stream 3 is connected to a port of circle mark 3 of the detector introduction stream switching valve B122 via a flow path G120. Each of the detector introduction stream switching valves A116 and B122 includes four ports, and the adjacent ports are connected with each other. The detector introduction stream switching valves A116 and B122 constitute a liquid chromatograph selection unit.

The detector introduction stream switching valve A116 switches between the stream 1 and the stream 2 to a side on which the eluate is fed to the detector introduction stream switching valve B122 on the detector 121 (mass spectrometry device) side and a side on which the eluate is fed to a drain. The detector 121 detects and analyzes the measurement target substance from the eluate eluted from the liquid chromatograph.

The detector introduction stream switching valve B122 on the detector 121 side switches between an eluate from the detector introduction stream switching valve A116 (an eluate from the stream 1 or the stream 2) and an eluate from the stream 3, and selects the eluate to be fed to the detector 121.

By switching the detector introduction stream switching valves A116 and B122, the stream measured by the detector 121 can be switched, and the single detector 121 can be shared among the plurality of streams 1, 2, and 3.

When the eluate from the stream 1 is fed to the detector 121, a port of a circle mark 1 and the port of the circle mark 2 of the detector introduction stream switching valve A116 are connected to each other, and the port of the circle mark 3 and a port of a circle mark 4 are connected to each other. Further, when the eluate from the stream 1 is fed to the detector 121, the port of the circle mark 1 and a port of a circle mark 2 of the detector introduction stream switching valve B122 are connected to each other, and the port of the circle mark 3 and a port of a circle mark 4 are connected to each other.

When the eluate from the stream 2 is fed to the detector 121, the port of the circle mark 1 and the port of the circle mark 4 of the detector introduction stream switching valve A116 are connected to each other, and the port of the circle mark 3 and the port of the circle mark 2 are connected to each other. Further, when the eluate from the stream 2 is fed to the detector 121, the port of the circle mark 1 and the port of the circle mark 2 of the detector introduction stream switching valve B122 are connected to each other, and the port of the circle mark 3 and the port of the circle mark 4 are connected to each other.

When the eluate from the stream 3 is fed to the detector 121, the port of the circle mark 1 and the port of the circle mark 4 of the detector introduction stream switching valve A116 are connected to each other, and the port of the circle mark 3 and the port of the circle mark 2 are connected to each other. Further, when the eluate from the stream 3 is fed to the detector 121, the port of the circle mark 1 and the port of the circle mark 4 of the detector introduction stream switching valve B122 are connected to each other, and the port of the circle mark 3 and the port of the circle mark 2 are connected to each other.

A display unit 124 is connected to the detector 121. The display unit 124 displays a necessity of exchange of the separation column that reaches an end of life.

Next, a sample introduction mechanism 200 in which the sample container 108 is moved to a predetermined sample nozzle suction position at which the sample suction nozzle suctions the sample 109 will be described with reference to FIG. 2. FIG. 2 is a diagram explaining the sample introduction mechanism.

In FIG. 2, the stream 1, 2, or 3 into which the sample is introduced to perform the measurement is selected by the sample introduction mechanism 200 according to a measurement item and a use situation. The sample introduction mechanism 200 includes a sample disk 202 containing a plurality of sample container holders 201 each holding the sample container 108.

A sample nozzle 107 for stream 1 that introduces the sample into the stream 1, a sample nozzle 204 for stream 2 that introduces the sample into the stream 2, and a sample nozzle 205 for stream 3 that introduces the sample into the stream 3 are disposed in the vicinity of the sample disk 202.

The sample nozzle 106 for stream 1, the second sample nozzle 204 for stream 2, and the sample nozzle 205 for stream 3 can be moved up and down and rotated by the driving mechanism (not shown).

Each of the sample nozzles 107, 204, and 205 is provided at a position on circumference of the sample disk 202 on which the sample container holders 201 are provided so as to be accessible by the vertical and rotational operations described above. The sample introduction mechanism 200 is controlled by a control unit 206 such that the sample container 108 is moved to the predetermined sample nozzle suction position. The control unit 206 controls the liquid chromatographs (the stream 1, the stream 2, and the stream 3), the liquid chromatograph selection unit (116 and 122), the detector 121, and the display unit 124.

The control unit 206 determines one of the streams 1, 2, and 3 to which the sample 109 is to be fed, using measurement request information which is a measurement item measurement order of the plurality of samples 109 to be continuously measured, information on the stream 1, 2, or 3 to be used determined by the measurement item, and information on the stream 1, 2, or 3 which is usable at a current time point as a determination reference.

Next, a method for determining a stream to be used as a main part of the embodiment of the invention will be described with reference to FIGS. 3, 4A, 4B, 4C, and 4D. FIG. 3 is a flow chart for determining the stream to be used. Further, FIGS. 4A to 4D are diagrams showing the method for determining a stream to be used based on a use state and the remaining number of use of the stream. The control unit 206 determines a stream to be used based on the flow shown in FIG. 3, and controls operations of the sample introduction mechanism 200, the streams 1 to 3, the detector introduction stream switching valve A116, the detector introduction stream switching valve B122, the detector 121, and the display unit 124. The control unit 206 stores the remaining number of use of each stream.

Here, the case of a configuration having the three stream exemplified in FIG. 1 will be described. The invention is applicable to a multi-stream liquid chromatograph mass spectrometry device having two or more streams.

First, the method for determining the stream to be used will be described with reference to FIG. 3. FIG. 3 is the flow chart of the method for determining the stream to be used.

As a premise, a specific time (for example, 60 seconds) is taken as a cycle, and the multi-stream liquid chromatograph mass spectrometry device has one sample introduction timing within one cycle. The number of cycles to be used varies depending on the measurement items in measurement using the cycle as a unit. This is because a time required for separation in the liquid chromatograph varies depending on the substance.

The control unit 206 determines whether there are one or more usable streams in the cycle (step S1). When there is no usable stream, the sample introduction in the cycle is skipped (step S3).

An example of this case is shown in FIG. 4A. In FIG. 4A, a circle mark indicates that a stream is being used and in a state in which next measurement cannot be started. A timing at which the next measurement is desired to be started is defined as a 0th cycle, and cycles before and after the 0th cycle are defined as a −1th cycle and a +1th cycle. At a time point of the 0th cycle, all of the stream 1, the stream 2, and the stream 3 are being used in previous measurement, and the next measurement cannot be started. Therefore, the measurement cannot be started at the 0th cycle, and the next measurement start timing is shifted to the next cycle afterwards.

In the +1th cycle which is the next cycle, since the stream 1 is usable (triangular mark), the next measurement is started using the stream 1.

In step S1, when it is determined that there are one or more usable streams in the cycle at a time point thereof, it is determined in step S2 whether there is only one usable stream in the cycle. When there is only one usable stream in the cycle, the usable stream is used (step S5). An example of this case is shown in FIG. 4B.

In FIG. 4B, the usable stream for the next measurement is only the stream 1 in the 0th cycle (only the stream 1 is the triangular mark, and the streams 2 and 3 are both circle marks). Therefore, in the 0th cycle, the next measurement is started using the stream 1.

In step S2, when there is more than one usable stream in the cycle, the determination is performed by the method specific to the embodiment of the invention. That is, in step S2, when there is more than one usable stream in the cycle, a process proceeds to step S4, and it is determined whether there is more than one stream having a minimum remaining number of use of the separation column.

When it is determined in step S4 that there are a plurality of streams each having the minimum remaining number of use of the separation column, the process proceeds to step S7, and a stream having a smaller stream number among the plurality of streams is used. An example of this case is shown in FIG. 4C.

In FIG. 4C, in the 0th cycle, there are two usable streams of the stream 1 and the stream 2. FIG. 4C shows a case where the stream 1 is usable and the next measurement is started (triangular mark). FIG. 4C shows a case where the stream 2 is usable but the next measurement is not started (black triangular mark). In this state, when the remaining numbers of use of the separation columns of the stream 1 and the stream 2 in a stage before the next measurement is started (−1th cycle) are compared, the remaining numbers of use are 50 which is the same for both of the stream 1 and the stream 2. In this case, the next measurement is started using the stream 1 having a smaller stream number (step S7).

When it is determined in step S4 that there is not more than one, but only one stream having the minimum remaining number of use of the separation column, the process proceeds to step S6, and the stream to which a separation column having the minimum remaining number of use is connected is used. An example of this case is shown in FIG. 4D.

In FIG. 4D, in the 0th cycle, there are two usable streams of the stream 1 and the stream 2. FIG. 4D shows a case where the stream 1 is usable but the next measurement is not started (black triangular mark). FIG. 4D shows a case where the stream 2 is usable and the next measurement is started (triangular mark). In this state, when the remaining numbers of use of the separation columns in the stage before the next measurement is started (−1th cycle) are compared, the remaining number of use for the stream 1 is 50 times and the remaining number of use for the stream 2 is 40 times. In this case, the stream 2 is selected based on the determination reference according to the embodiment of the invention, and the next measurement is started using the stream 2 (step S6). By using the stream 2 having the remaining number of use smaller than that of the stream 1, the remaining number of use of the stream 2 is further reduced. Accordingly, a life of the stream 2 reaches earlier than a life of the stream 1, and it is possible to prevent the stream 1 and the stream 2 from reaching an end of the life at the same period.

When the remaining numbers of use are the same, a stream having a smaller stream number is used based on the determination reference, and thus a stream having a smaller stream number reaches the end of life earlier, and it is possible to prevent the plurality of streams from reaching the end of life at the same period.

Since a performance of the separation column deteriorates as being used for the measurement, it is necessary to set a certain standard and exchange the separation column when the standard is reached. In the invention, the number of times the separation column can be used is defined as the remaining number of use. The remaining number of use of the separation column can be defined by the number of times the separation column can be used, an upper limit of pressure in the flow path, a limit of a fluctuation in a holding time of the liquid chromatograph, and the like. In the embodiment described above, the method for defining the remaining number of use by the number of times the separation column can be used is described.

As the separation column is used, a pressure loss increases due to contamination and the like. Therefore, for example, pressure in the flow path of the liquid feeding pumps (102a and 102b) measured by the pressure gauge 123 increases as the number of times the separation column is used increases. A method of setting an upper limit of the increased pressure of the flow path and enabling the separation column to be used until the upper limit of the pressure of the flow path is reached is a method of defining the remaining number of use of the separation column by the upper limit of the pressure of the flow path.

In this case, in the determination of the stream to be used, the remaining number of use is calculated based on a difference between the pressure at that time point and a predetermined allowable pressure upper limit value (reference pressure), and a stream having a minimum difference with the allowable pressure upper limit (having the minimum remaining number of use) is preferentially used.

In the method of using the holding time of the liquid chromatograph as a reference of the remaining number of use of the separation column, a reference value of a holding time of the specific component of the measurement target substance is set in advance, a limit value is set for a difference (deviation time) between an actually detected holding time of the specific component of the measurement target substance and a time reference value of the holding time, and when the limit value is exceeded, it is determined that the separation column reaches the end of life. In this case, a stream having a larger deviation time from the reference value of the holding time is preferentially used. This method can be performed by calculating the remaining number of use based on a difference value between the holding time of the specific component of the measurement target substance and the time reference value of the holding time, and selecting a stream having a smaller remaining number of use for use.

The holding time of the liquid chromatograph can be determined based on data output by the detector 121, the output of the detector 121 is supplied to the control unit 206, and the control unit 206 determines the holding time of the liquid chromatograph in each of the streams 1, 2, and 3, and determines a stream to be used.

As described above, according to the embodiment of the invention, when there is more than one usable stream, a stream including a separation column having a smaller remaining number of use and a shorter time period until the end of life can be preferentially used. The stream including the separation column having a smaller remaining number of use at a certain time point is more likely to be used even after the time point based on the determination reference according to the embodiment of the invention, and thus has a high possibility of reaching the end of life earlier than other streams.

On the other hand, other streams are used less frequently, so that the remaining number of use thereof is more likely to remain at the time point when the one stream reaches the end of life.

Accordingly, in the multi-stream liquid chromatograph, it is possible to reduce a risk of the plurality of streams reaching the end of life at the same time or close period which causes a decrease in the throughput and a decrease in the device.

Therefore, according to the embodiment of the invention, the analysis device having the liquid chromatograph and the liquid chromatograph analysis method are implemented, whereby it is possible to avoid a condition in which a plurality of separation columns reach the end of life and a plurality of streams become unusable at the same time, and to prevent a significant decrease in throughput and the stoppage of the device.

The example described above is an example in which the detector 121 is used as the mass spectrometry device, but the invention is not limited to the example in which the mass spectrometry device is used as the detector, and an ultraviolet visible light absorption photometer, an electrochemical measurement detector, and the like can also be used as the detector.

In the invention, the detector refers to a device including an element which converts a concentration of the measurement target substance into an electric amount such as a voltage or a current, and examples thereof include the mass spectrometer (mass spectrometry device), the ultraviolet visible light absorption photometer, and the electrochemical measurement detector.

Further, the plurality of streams can be grouped (for example, divided into a group of the streams 1 and 2, and the stream. 3), and life management can be performed for each group. For example, in the group of the streams 1 and 2, the remaining number of use can be averaged, the number of use of the stream can be controlled such that the stream. 3 is preferentially used and reaches the end of life earlier than the stream 1 and the stream 2. With this control, it is possible to avoid a situation in which all streams reach the end of life at almost the same time while using the selected plurality of streams in average.

Further, as described above, it is also possible to group the plurality of streams, average the number of use of the stream in the group, and perform control such that the end of life of the stream of the selected group reaches earlier between the groups.

The display unit 124 displays necessity of exchange of the separation column which reaches the end of life, and may display the tables shown in FIGS. 4A to 4D.

Further, when the invention is applied to a multi-stream liquid chromatograph device including two streams, the streams are numbered such as the stream 1 and the stream 2, and operation control is performed such that the stream 1 is preferentially used first, the stream 1 reaches the end of life earlier than the stream 2, so that it is possible to avoid a situation in which the stream 1 and the stream. 2 reach the end of life almost at the same time.

REFERENCE SIGN LIST

100*a* and 100*b*: Mobile phase liquid
101: Mobile phase liquid feeding unit
102*a* and 102*b*: Pump
103: Mixer part
104: Flow path A
105: Sample introduction switching valve
106: Flow path B
107: Sample suction nozzle
108: Sample container
109: Sample
110: Sample suction unit
111: Flow path C
112: Sample loop
113: Flow path D
114: Separation column
115: Flow path E
116: Detector introduction stream switching valve A
117: Separation column
118: Flow path F
119: Separation column
120: Flow path G
121: Detector
122: Detector introduction stream switching valve B
123: Pressure gauge
124: Display unit
200: Sample introduction mechanism
201: Sample container holder
202: Sample disk
204: Sample nozzle for stream 2
205: Sample nozzle for stream 3
206: Control unit

The invention claimed is:

1. An analysis device having a liquid chromatograph comprising:
   a plurality of liquid chromatographs each having a separation column for separating a measurement target substance from a sample, each liquid chromatograph being identified by an identification number;
   a liquid chromatograph selection unit for selecting one of the plurality of liquid chromatographs;
   a detector for detecting and analyzing the measurement target substance from an eluate eluted from the liquid chromatograph selected by the liquid chromatograph selection unit; and
   a control unit for controlling the plurality of liquid chromatographs, the liquid chromatograph selection unit, and the detector,
   wherein the control unit is configured to:
   upon determining more than one of the liquid chromatographs is useable, determine whether, among the useable liquid chromatographs, respective numbers of remaining uses of the separation columns are equal to each other,
   upon determining the numbers of remaining uses of the separation columns of the useable liquid chromatographs are equal to each other, control the liquid chromatograph selection unit to select the liquid chromatograph having a lowest identification number among the useable liquid chromatographs, and
   upon determining the numbers of remaining uses of the separation columns of the useable liquid chromatographs are not equal to each other, control the liquid chromatograph selection unit to select the liquid chromatograph having a lowest number of remaining uses among the useable liquid chromatographs.

2. The analysis device having a liquid chromatograph according to claim 1,
   wherein the liquid chromatograph includes a mobile phase liquid feeding unit for feeding a mobile phase liquid, a sample introducing unit for introducing the sample and feeding the introduced sample as a solution using the mobile phase liquid fed from the mobile phase feeding unit to the separation column, and a pressure gauge for measuring a liquid feeding pressure from the mobile phase liquid feeding unit,
   wherein the control unit calculates a difference between a pressure measured by the pressure gauge and a predetermined reference pressure, and calculates the remaining number of use from the calculated difference value.

3. The analysis device having a liquid chromatograph according to claim 1,
   wherein the control unit calculates a difference between a retention time reference value of a specific component of the measurement target substance detected by the detector and a predetermined retention time of the specific component, and calculates the remaining number of use from the calculated difference value.

4. The analysis device having a liquid chromatograph according to claim 1,
   wherein the detector is a mass spectrometer.

5. A liquid chromatograph analysis method of an analysis device, the analysis device including a plurality of liquid chromatographs each having a separation column for separating a measurement target substance from a sample, each liquid chromatograph being identified by an identification number, the method comprising: a liquid chromatograph selection unit for selecting one of the plurality of liquid chromatographs; a detector for detecting and analyzing the measurement target substance from an eluate eluted from the liquid chromatograph selected by the liquid chromatograph selection unit; and a control unit, the method comprising:

upon determining more than one of the liquid chromatographs is useable, determine whether, among the useable liquid chromatographs, respective numbers of remaining uses of the separation columns are equal to each other;

upon determining the numbers of remaining uses of the separation columns of the useable liquid chromatographs are equal to each other, controlling the liquid chromatograph selection unit to select the liquid chromatograph having a lowest identification number among the useable liquid chromatographs, and upon determining the numbers of remaining uses of the separation columns of the useable liquid chromatographs are not equal to each other, controlling the liquid chromatograph selection unit to select the liquid chromatograph having a lowest number of remaining uses among the useable liquid chromatographs.

6. The liquid chromatograph analysis method according to claim 5, wherein the liquid chromatograph includes a mobile phase liquid feeding unit for feeding a mobile phase liquid, a sample introducing unit for introducing the sample and feeding the introduced sample as a solution using the mobile phase liquid fed from the mobile phase feeding unit to the separation column, and a pressure gauge for measuring a liquid feeding pressure from the mobile phase liquid feeding unit, wherein a difference between a pressure measured by the pressure gauge and a predetermined reference pressure is calculated, and the remaining number of use is calculated from the calculated difference value.

7. The liquid chromatograph analysis method according to claim 5, wherein a difference between a retention time of a specific component of the measurement target substance detected by the detector and a predetermined retention time of the specific component is calculated, and the remaining number of use is calculated from the calculated difference value.

8. The liquid chromatograph analysis method according to claim 5, wherein the detector is a mass spectrometer.

* * * * *